(12) United States Patent
Kosterke (10) Patent No.: US 10,974,935 B2
(45) Date of Patent: Apr. 13, 2021

(54) DRUM-TYPE CONVEYING INSTALLATION WITH CABLE-MONITORING DEVICE

(71) Applicant: OLKO-MASCHINENTECHNIK GMBH, Olfen (DE)

(72) Inventor: Uwe Kosterke, Bochum (DE)

(73) Assignee: OLKO-MASCHINENTECHNIK GMBH, Olfen (DE)

(*) Notice: Subject to any disclaimer, the term of this patent is extended or adjusted under 35 U.S.C. 154(b) by 610 days.

(21) Appl. No.: 15/764,134

(22) PCT Filed: Sep. 28, 2016

(86) PCT No.: PCT/EP2016/073042
§ 371 (c)(1),
(2) Date: Mar. 28, 2018

(87) PCT Pub. No.: WO2017/055315
PCT Pub. Date: Apr. 6, 2017

(65) Prior Publication Data
US 2018/0305187 A1    Oct. 25, 2018

(30) Foreign Application Priority Data
Sep. 29, 2015   (DE) .................... 10 2015 116 515.5

(51) Int. Cl.
*B66C 13/00*    (2006.01)
*B66C 13/16*    (2006.01)
(Continued)

(52) U.S. Cl.
CPC .............. *B66C 13/16* (2013.01); *B66D 1/58* (2013.01); *G01G 19/18* (2013.01); *B66C 1/00* (2013.01)

(58) Field of Classification Search
CPC ....... B66B 5/125; B66B 5/145; B66C 13/085; B66C 13/105; B66C 13/16; B66C 13/50;
(Continued)

(56) References Cited

U.S. PATENT DOCUMENTS

| 4,462,484 A | 7/1984 | Crudele | |
|---|---|---|---|
| 2007/0205405 A1* | 9/2007 | Stockmaster | B66D 1/56 254/275 |
| 2010/0262384 A1* | 10/2010 | Marfani | B66D 1/741 702/43 |

FOREIGN PATENT DOCUMENTS

| DE | 29604729 U1 | 6/1996 |
|---|---|---|
| DE | 29715349 U1 | 10/1997 |

(Continued)

OTHER PUBLICATIONS

International Search Report dated Jan. 18, 2017 for PCT/EP2016/073042.

*Primary Examiner* — Emmanuel M Marcelo
(74) *Attorney, Agent, or Firm* — Lucas & Mercanti, LLP (57) ABSTRACT

A single-cable drum-type conveying installation with a cable drum driven by a winch drive, includes a cable-monitoring device, a conveying device, which hangs freely on a conveying cable, and an intermediate harness connecting the conveying cable to the conveying device. The cable-monitoring device includes a load-measuring pin, as a constituent part of the intermediate harness, and also a transmission path along which a measuring signal received from the load-measuring pin is transmitted to an evaluation device. The evaluation device is designed for evaluating the measuring signal such that, in the case of the measuring signal jumping by an extent which exceeds a certain amount, a malfunction is detected.

25 Claims, 7 Drawing Sheets

(51) Int. Cl.
*B66D 1/58* (2006.01)
*G01G 19/18* (2006.01)
*B66C 1/00* (2006.01)

(58) Field of Classification Search
CPC . B66D 1/505; B66D 1/56; B66D 1/58; G01G 19/18
See application file for complete search history.

(56) References Cited

FOREIGN PATENT DOCUMENTS

| | | |
|---|---|---|
| DE | 10144913 A1 | 6/2002 |
| DE | 102012111424 A1 | 5/2013 |
| EP | 0068683 B1 | 3/1986 |
| EP | 1988047 A1 | 11/2008 |
| WO | 2007084553 A2 | 7/2007 |

\* cited by examiner

Fig. 2c
Detail A
PRIOR ART

Fig. 3a — 1st cable situation, $m_{load} > m_{limit}$ overload

Fig. 3b — 2nd situation, "up" direction overload

Fig. 3c — 3rd situation, Hanging Cable

Fig. 6

DRUM-TYPE CONVEYING INSTALLATION WITH CABLE-MONITORING DEVICE

CROSS-REFERENCE TO RELATED APPLICATIONS

This application is a 371 of PCT/EP2016/073042 filed Sep. 28, 2016, which in turn claims the priority of DE 10 2015 116 515.5 filed Sep. 29, 2015, the priority of both applications is hereby claimed and both applications are incorporated herein by reference.

BACKGROUND OF THE INVENTION

The invention relates to a single-cable drum-type conveying installation with a cable drum which is driven by a winch drive. The installation comprises a cable-monitoring device, a conveying means which hangs freely from a conveying cable, and an intermediate harness which is configured to connect the conveying cable to the conveying means. Furthermore, the invention relates to a cable-monitoring method for a single-cable drum-type conveying installation.

Single-cable drum-type conveying installations are used as inspection units, auxiliary conveying installations and emergency conveying installations in mining. Irrespective of whether the single-cable drum-type conveying installation is operated in a stationary fashion or as a mobile installation, it must satisfy the technical requirements which are made of shaft hoisting systems and inclined hoisting systems (TAS). Accordingly, drum-type conveying installations have to be equipped with a suitable hanging cable-monitoring device which detects sticking of the conveying means over the entire travel path. It must be possible to re-start the conveying installation after the monitoring device has responded.

Monitoring of the hanging cable during operation of the drum-type conveying installation is necessary since there is the risk of the conveying means becoming stuck in the shaft during the downward travel. If this sticking is not noticed, more and more conveying cable is unwound from the cable drum and the so-called hanging cable is formed. If the conveying means becomes detached, it falls away and the conveying cable would probably be torn off. If persons are located in the conveying means (conveying basket), a serious accident occurs.

DE 297 15 349 U1 discloses hanging cable monitoring devices in which a reel which is coupled to a switch is positioned on the obliquely running section of the cable between the cable drum and the cable pulley on the conveyor. If this cable section sags owing to a hanging cable formation, the switch is activated and a malfunction is detected. The drive of the cable drum is switched off and an emergency braking operation is initiated. Such monitoring of a hanging cable does not react until the conveying means has already become obliquely positioned. If the conveying means is located in the lower shaft region, the weight of the cable is so large that the monitoring device does not respond at all. For this reason, this monitoring of the hanging cable is usually supplemented by a second monitoring device in the region of the conveying means.

A further possibility of monitoring a hanging cable is for a contact strip to be attached to the underside of the conveying means, which strip detects setting down of the basket. However, the contact strip does not respond if the conveying means becomes stuck on the side walls.

Furthermore, it is known to carry out monitoring of a hanging cable by means of a load measurement on the winch drive. A disadvantage of this monitoring of the hanging cable is that in order to measure the hanging load the bent length of the hanging cable and the weight of the cable have to be taken into account.

EP 0 068 683 B1 discloses a single-cable drum-type conveying installation comprising a monitoring of a hanging cable during which, in one embodiment, travel sensors for monitoring the cable load are arranged in such a way that the loading is measured at a connection between the conveying cable end and the conveying basket. The load signals are transmitted to an evaluation device by means of signal means. If the load signals drop below a predetermined value, a conveying machine trigger signal is generated.

BRIEF SUMMARY OF THE INVENTION

Taking this prior art as a starting point, the invention is based on the object of providing a single-cable drum-type conveying installation of the type mentioned at the beginning whose cable-monitoring device immediately and reliably detects a malfunction when malfunction situations occur independently of the position of the conveying means in the shaft and independently of the cable load. Furthermore, a method for monitoring the cable for a single-cable drum-type conveying installation is to be specified.

This object is achieved with a single-cable drum-type conveying installation of the type mentioned at the beginning by virtue of the fact that
  the cable-monitoring device has a load-measuring pin as a component of the intermediate harness and has a transmission path for transmitting the measurement signals received from the load-measuring pin to an evaluation device, and
  the evaluation device for evaluating the measurement signals is configured in such a way that a malfunction is detected when a signal jump, which exceeds a specific magnitude, occurs in the measurement signal.

By virtue of the arrangement of the load-measuring pin in the intermediate harness, the load is measured continuously using the load-measuring pin, independently of the position of the conveying means in the shaft and independently of the cable load. The evaluation device for evaluating the measurement signals of the load-measuring pin is configured in such a way that a malfunction is detected when a signal jump occurs in the measurement signal. The level of the measurement signal correlates with the level of the load. In the usual operation of the conveying means, the acquired measurement signal corresponds to the hanging load, i.e. to the mass of the conveying means and to the loading of the conveying means. If the conveying means sets down or becomes stuck during the downward movement, the load acting on the load-measuring pin is suddenly reduced, which is expressed in a negative signal jump. If the conveying means becomes stuck during the upward movement, a positive signal jump occurs. Furthermore, the cable-monitoring device permits continuous monitoring of the loading of the conveying means so that the latter is not overloaded.

The transmission path for transmitting the measurement signals which are acquired by the load-measuring pin to the evaluation device which is located above ground is preferably carried out by signal lines which are integrated into the conveying cable. Alternatively, the measurement signals can be transmitted via a radio link.

The load pin is arranged in the intermediate harness for transmitting force from the cable to the intermediate harness in such a way that it is primarily loaded by transverse forces. In order to achieve correct measurement results, the load-measuring pin in the intermediate harness is secured against rotation and axial shifting. It is secured, in particular, by means of axle securing grooves into which corresponding axle securing elements, which are screwed onto the intermediate hardness, engage.

The transverse forces which occur in the load-measuring pin are preferably measured by means of strain gauges which are provided in corresponding recesses in the load-measuring pin and are integrated into an electrical circuit, in particular into a bridge circuit. Since the changes in resistance of the strain gauges are relatively small, the measurement signal is amplified. The amplifier for the measurement signals is preferably integrated into the load-measuring pin. The signal profile which is continuously acquired by the load-measuring pin is illustrated as a characteristic curve and additionally as a digital value for further analysis purposes by means of an operator control and display unit. Furthermore, the limiting values can be input by means of the operator control and display unit.

The voltage supply of the load-measuring pin, i.e. of the electrical circuit and of the amplifier, is provided via an electrical energy accumulator which is arranged on the conveying means and which additionally ensures the voltage supply of the shaft signal system (SSA) on the conveying means.

The evaluation device evaluates a change in the measurement signal over time, in particular by means of monitoring software:

If the load-dependent measurement signal decreases suddenly when the conveying cable unwinds (hanging), this is manifested as a negative signal jump in the signal evaluation. In this case, the evaluation unit detects a hanging cable as a malfunction. A safety device then brings about switching actions, in particular causes the winch drive to be switched off and a brake acting on the cable drum to be activated. Moreover, the safety device has the effect that re-starting of the switched-off winch drive after a hanging cable malfunction is possible exclusively in the upward direction of the conveying means.

If the load-dependent measurement signal increases during the winding on of the conveying cable (driving) suddenly, this is manifested as a positive signal jump in the signal evaluation. In this case, the evaluation unit detects, as a malfunction, an overload which is caused by the conveying means becoming stuck in the shaft or as an obstacle. A safety device then brings about switching actions, in particular causes the winch drive to be switched off and the brake acting on the cable drum to be activated. Furthermore, the safety device has the effect that re-starting of the switched-off winch drive after the overload malfunction is possible exclusively in the downward direction of the conveying means.

A malfunction is to be detected only in the case of load jumps which exceed a specific magnitude. This avoids a situation in which a malfunction is already detected as a result of minor fluctuations in the load which is measured by the measuring pin, for example as a result of oscillations in the conveying cable. One possible way of ensuring a sufficient magnitude of the load jumps for reliable detection of malfunctions is that the malfunction is detected only when there is a negative signal jump to a value which is less than a predefined lower limiting value, and when there is a positive signal jump to a value which is more than an upper limiting value.

In one advantageous refinement of the invention, the evaluation device is also configured in such a way that a malfunction is detected if the measurement signal exceeds a maximum limiting value which is stored in the evaluation device. If the load-dependent measurement signal exceeds the pre-set limiting value which correlates with the maximum permissible hanging load, the evaluation unit detects an overload as a malfunction. Then, after the starting of the winch drive, a safety device brings about switching actions, in particular causes the winch drive to be switched off and the brake acting on the cable drum to be activated. Moreover, the safety device has the effect that re-starting of the switched-off winch drive after the overload malfunction is possible exclusively in the upward direction of the conveying means.

In order to ensure a redundant measuring method with the cable monitoring device, the load-dependent signal is tapped directly at the frequency inverter of the winch drive and evaluated. Alternatively, the cable monitoring device has at least one measured value transducer for acquiring load-dependent signals at the winch drive. In the case of redundant monitoring, the evaluation unit is configured in such a way that a malfunction is detected when a signal jump which exceeds a specific magnitude occurs. One possible way of ensuring a sufficient magnitude of the load jumps for reliable detection of malfunctions consists also here in that the malfunction is detected only when there is a negative signal jump to a value which is less than a predefined lower limiting value and when there is a positive signal jump to a value which is more than an upper limiting value.

If the winch drive comprises a hydraulic motor, the measured values are received by means of a pressure transducer which is configured to acquire the working pressure of the hydraulic motor. The working pressure of the hydraulic motor is directly proportional to the load on the cable drum. The overall pressure $P_{overall}$ corresponds to the overall load which results from the hanging load and the cable hoist load which increases continuously during the downward movement of the conveying means and decreases continuously during the upward movement. If a sufficiently large signal jump of the depth-dependent overall load then occurs during the upward or downward movement of the conveying means, a malfunction is detected.

In a first embodiment of the single-cable drum-type conveying installation according to the invention, the load is transmitted from the conveying means to the conveying cable exclusively via the load-measuring pin. The conveying cable usually has, at its end facing the conveying means, a cable thimble. The load-measuring pin penetrates a passage in the intermediate harness and in the cable thimble largely without play and therefore carries the entire load.

In a second embodiment of the invention, in addition a safety pin, which also penetrates a passage in the intermediate harness and in the cable thimble, is arranged between the cable thimble and the intermediate harness, wherein the passage in the cable thimble and/or the passage in the intermediate harness surrounds the safety pin to form an annular gap. The annular gap is dimensioned in such a way that when the load-measuring pin is intact the safety pin is not load bearing and does not adversely affect the measurement at the measuring pin.

A technical effect of this solution is that in order to meet the safety requirements of the mining authorities, a weaker load-measuring pin can be used which has a safety level below that required by the mining authorities in terms of breaking strength. In the case of failure, the safety pin which is preferably arranged underneath the load-measuring pin transmits the load with a level of safety with respect to breaking strength which satisfies the safety requirements of the mining authorities. Owing to the lower level of rigidity of the load-measuring pin, the measuring accuracy of the load-measuring pin is increased with the same level of safety of the transmission of force between the conveying cable and the intermediate harness.

Furthermore, it is possible to conceive of a refinement of the cable-monitoring device in which two strain gauges are arranged, one on each side of the cable thimble underneath a support pin which has merely a supporting function. Temperature influences and flexural influences are compensated through the installation of two strain gauge (DMS) half bridges on the two sides of the cable thimble. The two half bridges are connected to form a Wheatstone bridge. The strain gauges are then cast after their attachment and, together with the connecting cables, protected against mechanical damage by means of metal sheet coverings.

If the winch drive comprises an electric motor, the power consumption of the electric motor is continuously monitored. The power consumption of the electric motor is directly proportional to the overall load which results from the hanging load and the cable hoist load which increases continuously during the downward movement of the conveying means and decreases continuously during the upward movement. If a sufficiently large signal jump of the depth-dependent overall load then occurs during the upward movement or downward movement of the conveying means, a malfunction is detected.

BRIEF DESCRIPTION OF THE DRAWINGS

The cable-monitoring method for a single-cable drum-type conveying installation and the drum conveying installation will be explained in more detail below. In the drawings.

DETAILED DESCRIPTION OF THE PREFERRED EMBODIMENTS

Figure 1:
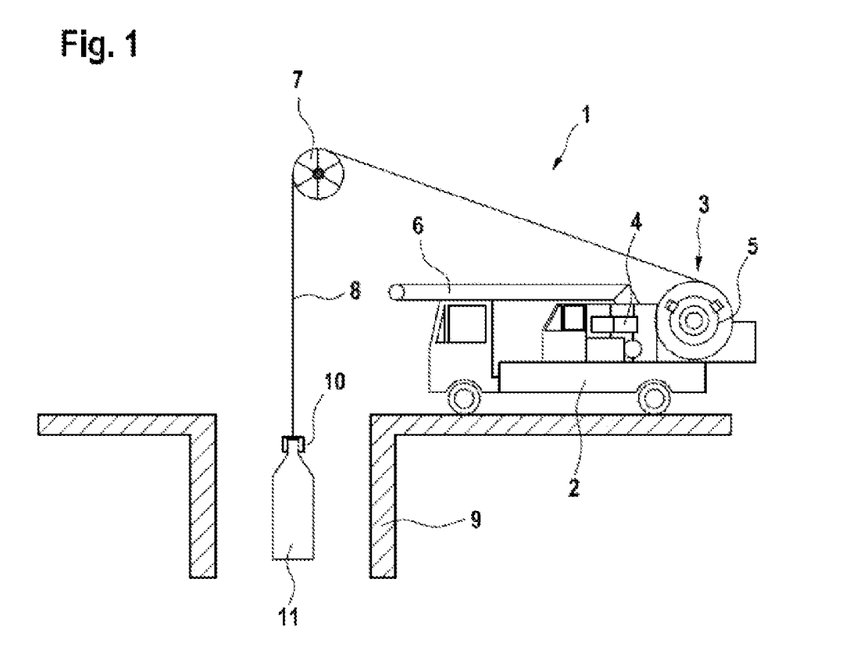
FIG. 1 shows a schematic illustration of a single-cable drum-type conveying installation, embodied as a mobile rescue winch.

FIG. 1 shows a mobile shaft winch (1) with a truck as a carrier vehicle (2). A single-cable drum-type conveying installation (3) with a cable drum (5) which is driven by a winch drive (4) is arranged on the carrier vehicle (2). A conveying cable (8) which can be wound onto or unwound from the cable drum (5) is deflected into a shaft (9) via an extension arm (6) or a cable pulley (7) which is arranged on the conveyor. The conveying cable (8) is connected via an intermediate harness (10) (illustrated schematically in FIG. 1) to a conveying means (11) (also referred to as a conveying device) which hangs freely from the conveying cable (8). The conveying means (11) is, in particular, a conveying basket for providing emergency access to the shaft (9).

Figure 2A:
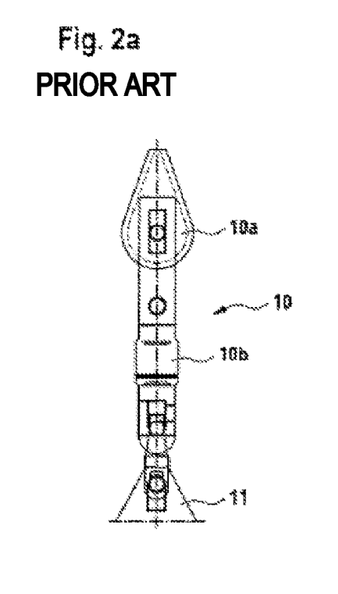
FIG. 2a shows a front view of an intermediate harness of the single-cable drum-type conveying installation according to FIG. 1.
Figure 2B:
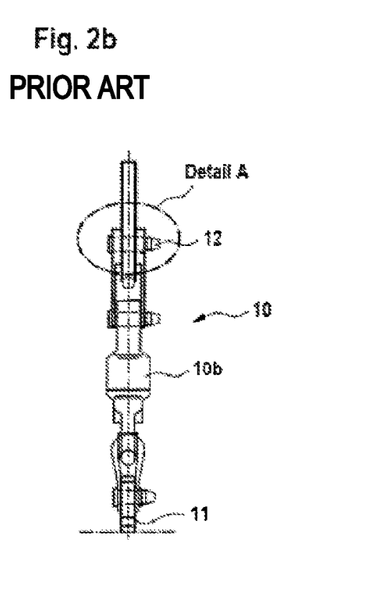
FIG. 2b shows a side view of the intermediate harness according to FIG. 2a, FIG. 2c shows an illustration of a load-measuring pin in the intermediate harness according to FIGS. 2a and 2b.

From the illustration of the intermediate harness (10) in FIGS. 2a, 2b it is apparent that a cable thimble (10a) is attached to the intermediate harness (10) via a load-measuring pin (12). The conveying means (11) is attached to the lower end of the intermediate harness (10). Between them there is a swivel means which permits the conveying means to rotate about the cable axis.

Figure 2C:
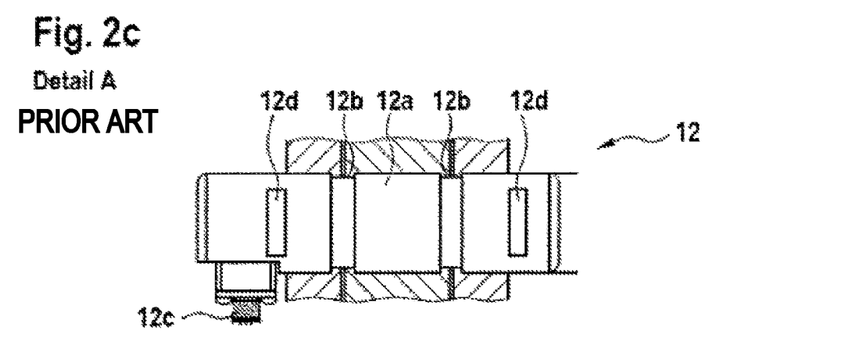

The load-measuring pin (12) which is illustrated in FIG. 2c has a central section (12a) into which lateral forces are input via the cable thimble (10a). In the recesses (12b) which are arranged next to the central section (12a) strain gauges (20), which are integrated into an electrical circuit (22), for receiving the load-dependent measurement signals are arranged, said measurement signals being amplified in an amplifier (21) which is integrated into the load-measuring pin (12). The voltage supply of the amplifier and of the electrical circuit and the transmission of signals are provided via a plug-type contact (12c) on one of the end sides of the load-measuring pin (12). Axial shifting and rotation of the load-measuring pin (12) in the intermediate harness (10) is prevented by two axle securing grooves (12d) into which axle securing plates, which can be screwed onto the intermediate harness, engage.

Figure 1A:
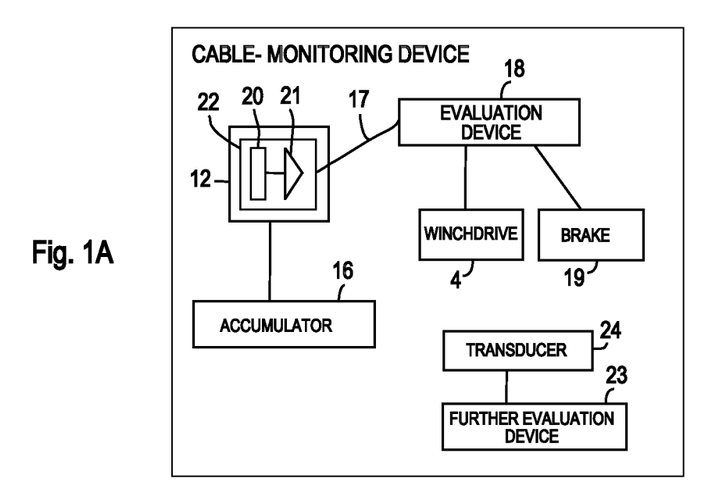
FIG. 1a shows a schematic block diagram of components of a cable-monitoring device of the installation according to FIG. 1.

The voltage supply of the load-measuring pin (12) is provided by means of an energy accumulator (16) which is arranged on the conveying means (11) and is also provided for supplying voltage to the shaft signal system (SSA) or directly via an electrical conductor in the conveying cable. The measurement signals are transmitted by a transmission path (17), i.e. electrical leads integrated into the conveying cable (8), to the central controller in the mobile shaft winch (1) which also has an evaluation device (18) for evaluating the measurement signals. The evaluation device (18) is able to detect an overload and a hanging cable as malfunctions. When a malfunction is detected, a safety device of the central controller carries out switching actions, in particular switches off the winch drive (4) and/or activates a brake (19) of the cable drum.

Figure 2D:
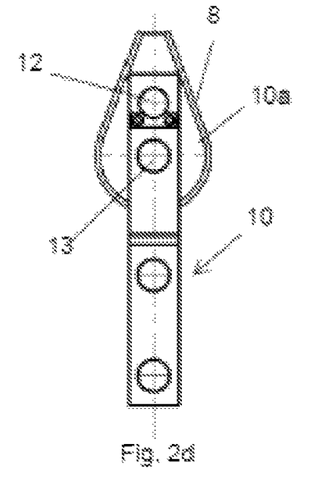
FIG. 2d shows a front view of a second exemplary embodiment of a partially illustrated integrated harness of the single-cable drum-type conveying installation according to FIG. 1.
Figure 2E:
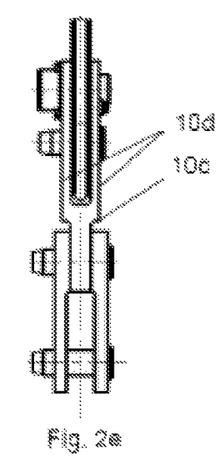
FIG. 2e shows a side view of the intermediate harness according to FIG. 2d.
Figure 2F:
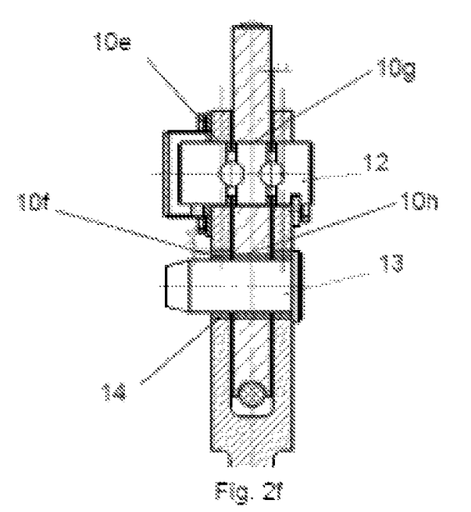
FIG. 2f shows a sectional side view of the intermediate harness according to FIG. 2d.

In FIGS. 2d, 2e and 2f, a connection is illustrated between the conveying cable (8) and the intermediate harness (10), in which connection a safety pin (13) is additionally arranged between the cable thimble (10a) and the intermediate harness (10). The measuring pin (12) corresponds, in terms of design and the method of functioning, to that according to FIG. 2c, with the result that reference is made to the explanations there in order to avoid repetitions.

The intermediate harness (10) has a fork-shaped clip (10c) with two webs (10d) which are arranged parallel to one another and at a distance from one another. The webs (10d) are penetrated by a passage (10e) for receiving the load-measuring pin (12) and by a further passage (10f) for receiving the safety pin (13). The passage (10f) for receiving the safety pin (13) is arranged underneath the passage (10b) for receiving the load-measuring pin (12). In the cable thimble (10a) there is an upper passage (10g) which is aligned with the passage (10e) in the webs (10d). Furthermore, in the cable thimble (10a) there is a lower passage (10h), which is aligned with the passages (10f) in the webs (10d). The passage (10f) in the clip (10c) of the intermediate harness (10) surrounds the safety pin (13) to form an annular gap (14), which is dimensioned in such a way that when the load-measuring pin is intact the safety pin (13) does not have a load-bearing function. Furthermore, the annular gap (14) is dimensioned in such a way that the deformation which is necessary for the strain gauges on the load-measuring pin (12) to respond is not adversely affected by the safety pin. The safety pin (13) is of cylindrical design with a smooth surface. When failure occurs, the safety pin (13) which is arranged underneath the measuring pin (12) would transmit the rated load, for example, with ten times the safety compared to the breaking strength. The load-measuring pin (12) meanwhile has significantly lower safety compared to the breaking strength, for example four times the safety. If the load-measuring pin breaks, the clip (10c) slips downward and the safety pin (13) assumes the load-bearing function of the load-measuring pin (12).

Figure 3A:
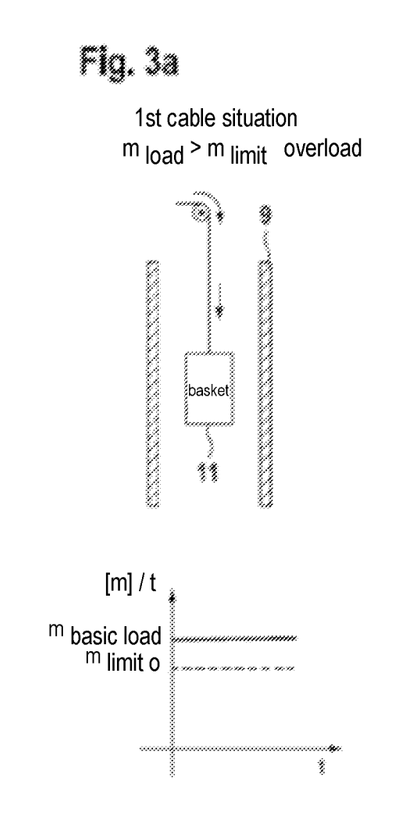
FIG. 3a shows a schematic illustration of the malfunction situation of "overload in the downward movement and upward movement of the conveying means" and the signal profile which is acquired by the measuring pin.
Figure 3B:
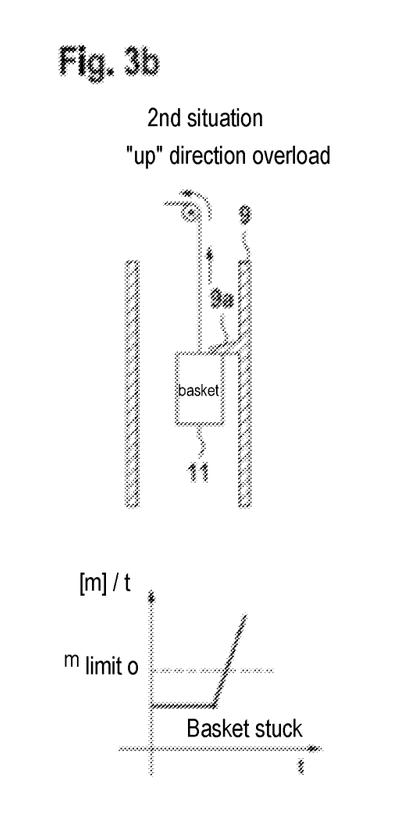
FIG. 3b shows a schematic illustration of the malfunction situation of "overload in the upward movement of the conveying means" and the signal profile acquired by the measuring pin.
Figure 3C:
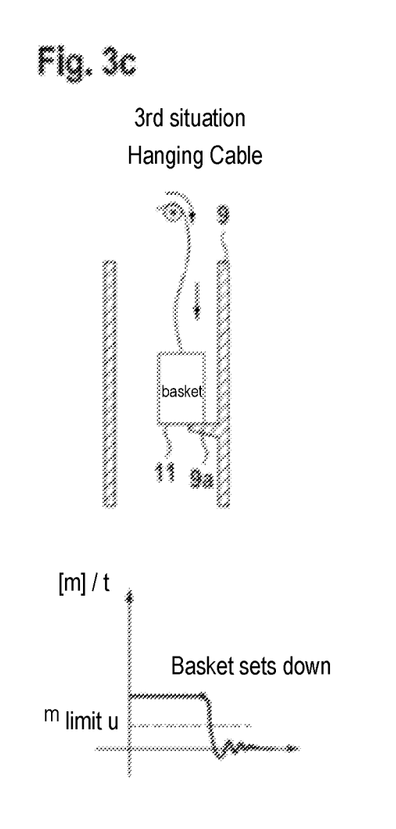
FIG. 3c shows a schematic illustration of the malfunction situation of "hanging cable in the downward movement of the conveying means" and the signal profile acquired by the measuring pin.

FIG. 3a-3c illustrate various malfunction situations which are detected with the monitoring of the cable:

FIG. 3a shows the malfunction situation of "overload in the downward movement or the upward movement of the conveying means", i.e. during the unwinding or winding of the conveying cable (8) from or onto the cable drum (5). If the load-dependent measurement signal exceeds the pre-set upper limiting value $m_{limit\ u}$, which correlates to a maximum permissible hanging load, the evaluation unit detects an overload as a malfunction.

FIG. 3b shows the malfunction situation of "overload in the upward movement of the conveying means", i.e. during the winding of the conveying cable (8) onto the cable drum (5). If the conveying cable (11) remains stuck, for example, at an obstacle (9a) in the shaft (9) in the upward movement, a signal jump, corresponding to the load jump, occurs in the measurement signal to a value above the pre-set upper limiting value $m_{limit\ u}$, which is detected as a malfunction by the evaluation device.

FIG. 3c shows the malfunction situation of "hanging cable in the downward movement of the conveying means", i.e. during the unwinding of the conveying cable (8) from the cable drum (5). When the conveying means sets down on the obstacle (9a) in the shaft (9), a negative signal jump occurs which is detected as a malfunction by the evaluation device when a pre-set lower limiting value $m_{limit\ l}$ is exceeded.

The winch drive is switched off in all the malfunction situations. In the malfunction situation of "overload by the conveying means" in the downward movement or upward movement, re-starting of the switched-off winch drive is possible exclusively in the opposite direction, and/or the conveying means has to be unloaded up to the point where the permissible hanging load is reached. In the malfunction situation of "overload in the upward movement of the conveying means" (basket has become stuck), re-starting of the switched-off winch drive is possible exclusively for unwinding the conveying cable. In the malfunction situation of "hanging cable in the downward movement of the conveying means", re-starting of the switched-off winch drive is possible exclusively for winding on the conveying cable. This configuration of the safety device ensures that the danger caused by the malfunction is not increased by re-starting of the winch drive.

In order to ensure redundant monitoring of the cable of the single-cable drum-type conveying installation (3), the cable-monitoring device can additionally have a transducer (24) for acquiring load-dependent signals at the frequency inverter of the winch drive (4) and a further evaluation unit (23) for evaluating the acquired load-dependent signals which is configured in such a way that a malfunction is detected when a signal jump occurs. The signal which corresponds to the overall load $m_{load}$ during usual operation is composed of a value which corresponds to the hanging load $m_{basic\ load}$ and a value which corresponds to the depth-dependent cable hoist load $m_{cable}$.

Figure 4:
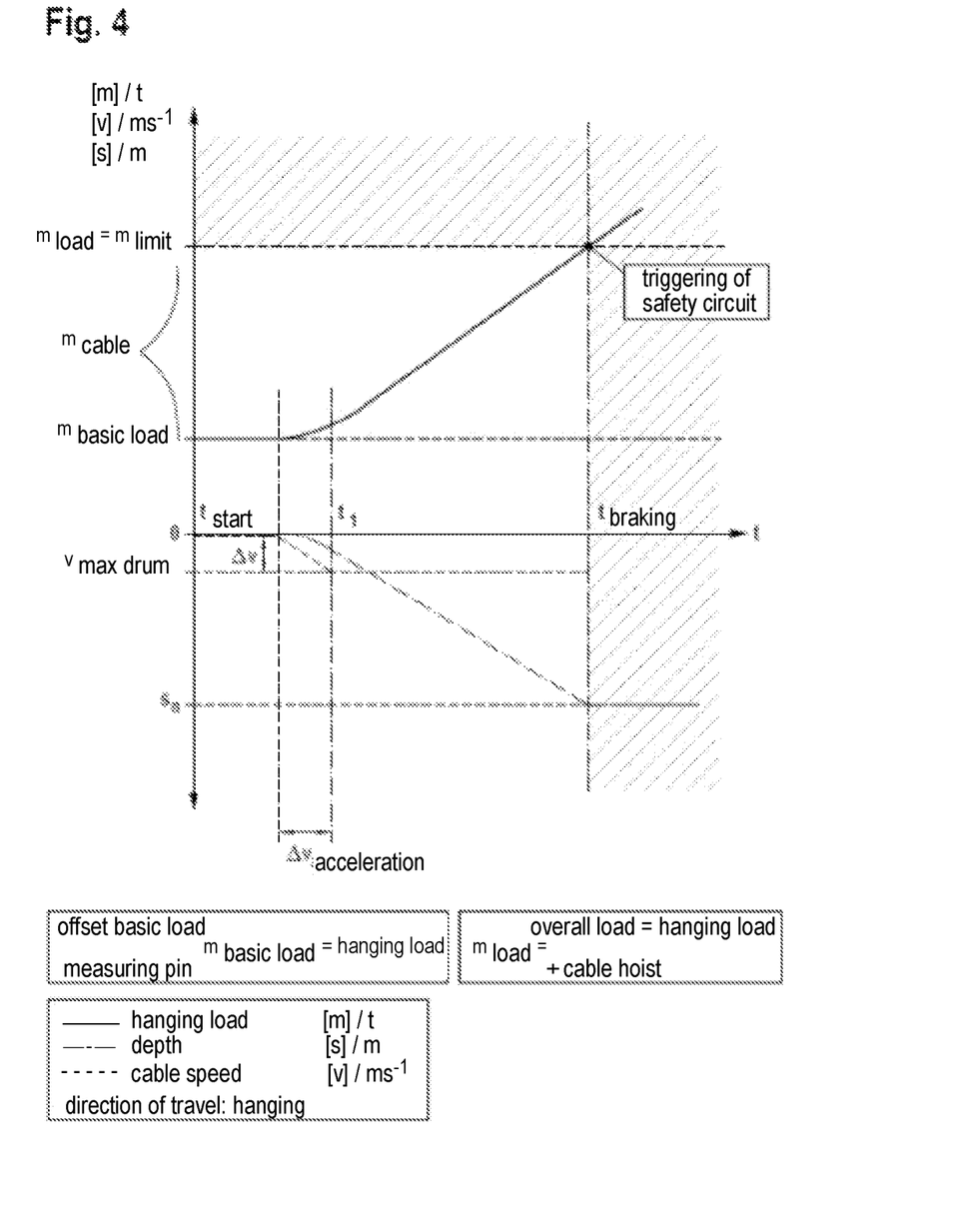
FIG. 4 shows a profile of the load-dependent signals at the winch drive in the case of redundant monitoring in the malfunction situation of "overload in the upward movement and downward movement of the conveying means"

FIG. 4 shows the malfunction situation of "overload by the conveying means", i.e. during the winding of the conveying cable onto the cable drum or unwinding thereof from the cable drum. When the pre-set limiting value $m_{limit}$ is exceeded, a fault is detected. At this time, the hanging load $m_{basic\ load}$ plus the cable hoist load $m_{cable}$ i.e. the overall load $m_{load}$ is higher than the limiting value $m_{limit}$.

Figure 5:
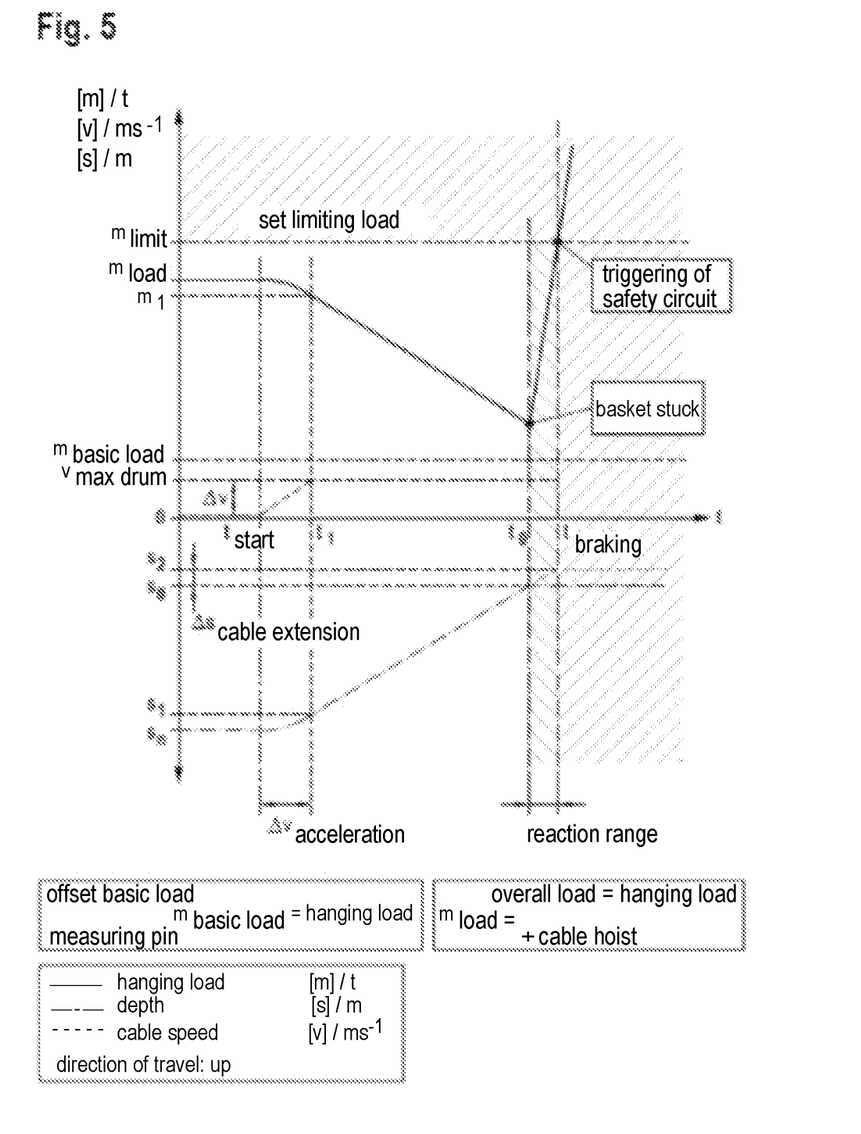
FIG. 5 shows a profile of load-dependent signals at the winch drive in the case of redundant monitoring in the malfunction situation of "overload in the upward movement of the conveying means"

FIG. 5 shows the malfunction situation of "overload in the upward movement of the conveying means". It is apparent how the overall load $m_{load}$ becomes continuously smaller during the upward movement owing to the decreasing cable hoist load $m_{cable}$. If the conveying means (11) becomes stuck at an obstacle (9a), a positive signal jump occurs which exceeds the pre-set limiting value $m_{limit}$, with the result that the evaluation unit detects a malfunction.

Figure 6:
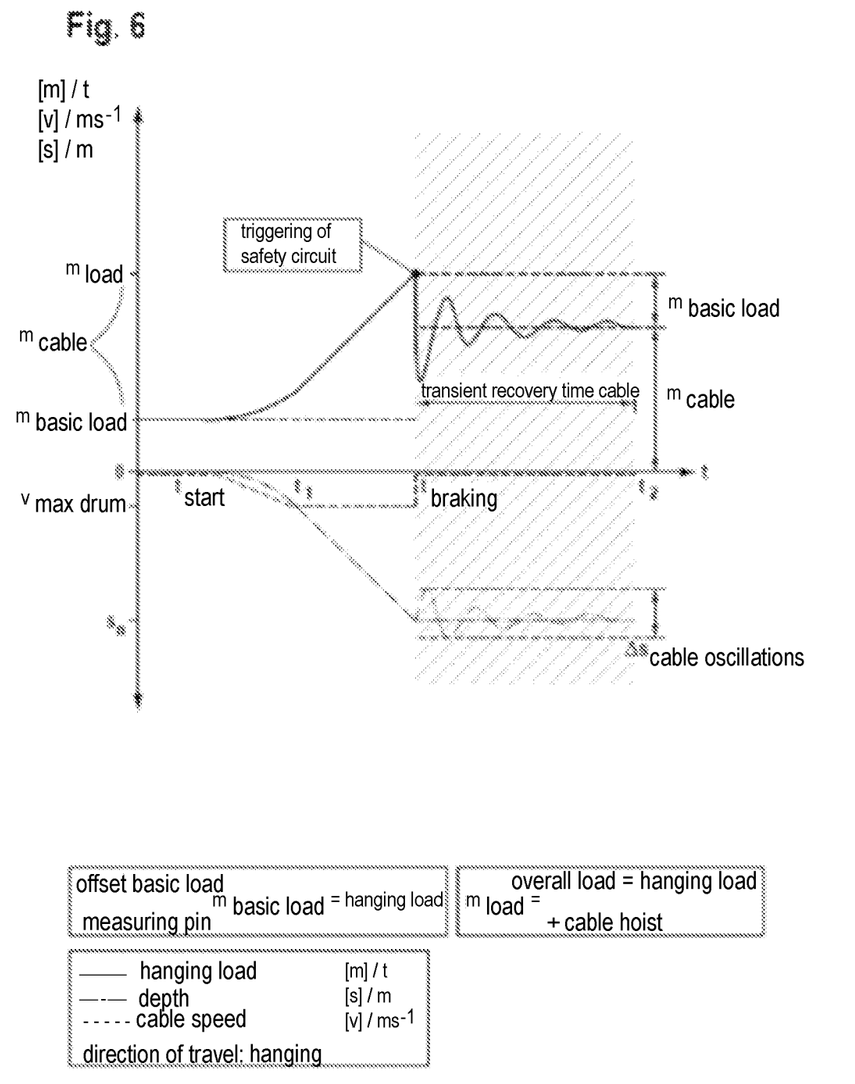
FIG. 6 shows a profile of load-dependent signals at the winch drive in the case of redundant monitoring in the malfunction situation of "hanging cable in the downward movement of the conveying means".

FIG. 6 shows the malfunction situation of "hanging cable in the downward movement of the conveying means". It is apparent how the overall load $m_{load}$ becomes continuously larger during the downward movement owing to the increasing cable hoist load $m_{cable}$. If the conveying means then sets down on an obstacle (9a), a negative signal jump occurs, which the evaluation unit detects as a hanging cable malfunction if the signal jump exceeds a lower limiting value. After a transient recovery time, the load which has been measured in this malfunction situation then corresponds only to the cable hoist load $m_{cable}$ acting at this time. For this malfunction situation, the lower limiting value is defined in situ by means of reference measurements or empirical values. The permissible signal jumps which occur during the usual operation must not give rise to an incorrect malfunction detection. The lower limiting value can be defined during the usual operation by means of the empirical values relating to the signal jumps.

The evaluation units of the measurement signals from the load-measuring pin (12) and the measurement signals from the measured value transducer on the winch drive exchange their evaluation results continuously via an internal bus link. The safety device is preferably programmed in such a way that a switching action is triggered only when both evaluation devices signal a malfunction.

| No. | Designation |
| --- | --- |
| 1. | Mobile shaft winch |
| 2. | Carrier vehicle |
| 3. | Single-cable drum-type conveying installation |
| 4. | Winch drive |
| 5. | Cable drum |
| 6. | Extension arm |
| 7. | Cable pulley |
| 8. | Conveying cable |
| 9. | Shaft |
| 9a. | Obstacle |
| 10. | Intermediate harness |
| 10a. | Cable thimble |
| 10b. | Swiveling means |
| 10c. | Clip |
| 10d. | Webs |
| 10e. | Passage through load-measuring pin |
| 10f. | Passage through securing pin |
| 10g. | Passage through load-measuring pin |
| 10h. | Passage through securing pin |
| 11. | Conveying means |
| 12. | Load-measuring pin |
| 12a. | Central section |
| 12b. | Recess |
| 12c. | Plug-type contact |
| 13. | Safety pin |
| 14. | Annular gap |
| 16. | Energy accumulator |
| 17. | Transmission path |
| 18. | Evaluation device |
| 19. | Brake |
| 20. | Strain gauges |
| 21. | Amplifier |
| 22. | Electrical circuit |

The invention claimed is:

1. A single-cable drum-type conveying installation, comprising:
a cable drum driven by a winch drive,
a conveying device hanging freely from a conveying cable,
an intermediate harness connecting the conveying cable to the conveying device;
a cable-monitoring device including a load-measuring pin, an evaluation device, and a transmission path for transmitting a measurement signal received from the load-measuring pin to the evaluation device, the load-measuring pin being being a component of the intermediate harness, the evaluation device evaluating the measurement signal of the load-measuring pin and configured to detect a malfunction when a signal jump occurs in the measurement signal;
a cable thimble of the conveying cable attached to the intermediate harness by the load-measuring pin;
a safety pin penetrating a passage in the intermediate harness and a passage in the cable thimble and arranged between the cable thimble and the intermediate harness, wherein at least one of the passage in the cable thimble and the passage in the intermediate harness surrounds the safety pin to form an annular gap.

2. The single-cable drum-type conveying installation as claimed in claim 1, wherein the evaluation device for evaluating the measurement signal of the load-measuring pin is configured to detect the malfunction when there is a negative signal jump to a value which is less than a predefined lower limiting value and when there is a positive signal jump to a value which is higher than an upper limiting value.

3. The single-cable drum-type conveying installation as claimed in claim 1, wherein the transmission path has signal lines which are integrated into the conveying cable.

4. The single-cable drum-type conveying installation as claimed in claim 1, wherein the load-measuring pin is secured against rotation and axial shifting in the intermediate harness.

5. The single-cable drum-type conveying installation as claimed in claim 1, wherein the load-measuring pin includes strain gauges integrated into an electrical circuit, the strain gauges receiving the measurement signals.

6. The single-cable drum-type conveying installation as claimed in claim 1, wherein an amplifier for the measurement signals is integrated into the load-measuring pin.

7. The single-cable drum-type conveying installation as claimed in claim 5, wherein the voltage supply of the load-measuring pin is provided via an electrical energy accumulator, arranged on the conveying device, or an electrical lead which is integrated into the conveying cable.

8. The single-cable drum-type conveying installation as claimed in claim 1, wherein the evaluation device is configured to detect a malfunction if the measurement signal is higher than an upper limiting value which is stored in the evaluation device.

9. The single-cable drum-type conveying installation as claimed in claim 1, wherein the cable-monitoring device has a safety device which is configured to cause at least one of the winch drive to be switched off and a brake cable drum to be activated when a malfunction is detected by the evaluation device.

10. The single-cable drum-type conveying installation as claimed in claim 9, the safety device is also configured to allow re-starting the switched-off winch drive exclusively for winding the conveying cable onto the cable drum when a malfunction is detected in response to a negative signal jump while the conveying cable is being unwound from the cable drum.

11. The single-cable drum-type conveying installation as claimed in claim 10, wherein the safety device is also configured to allow re-starting of the switched-off winch drive exclusively for unwinding the conveying cable when a malfunction is detected in response to a positive signal jump while the conveying cable is being wound onto the cable drum.

12. The single-cable drum-type conveying installation as claimed in claim 1, wherein the cable-monitoring device includes at least one transducer for acquiring a load-dependent signal at the winch drive, and a further evaluation device for evaluating the measurement signal of the transducer configured to detect a malfunction when a signal jump occurs in the load-dependent signals.

13. The single-cable drum-type conveying installation as claimed in claim 12, wherein the winch drive comprises a hydraulic motor, and each transducer is a pressure transducer configured to acquire a working jolt of the hydraulic motor.

14. The single-cable drum-type conveying installation as claimed in claim 12, wherein the winch drive comprises an electric motor, and each transducer is an ammeter configured to measure the power consumption of the electric motor.

15. The single-cable drum-type conveying installation as claimed in claim 1, wherein the annular gap is dimensioned such that the safety pin does not have a load-bearing function when the load-measuring pin is intact.

16. The single-cable drum-type conveying installation as claimed in claim 1, wherein a breaking strength of the load-measuring pin is lower than a breaking strength of the safety pin.

17. A method for monitoring a cable in a single-cable drum-type conveying installation with a cable drum driven by a winch drive, a conveying device which hangs freely from the conveying cable, and an intermediate harness connecting the conveying cable to the conveying device, the method comprising:
- monitoring a load using a load-measuring pin, wherein a cable thimble of the conveying cable is attached to the intermediate harness by the load-measuring pin,
- transmitting a measurement signal received by the load-measuring pin to a first evaluation device for evaluating the measurement signal,
- detecting, by the first evaluation device, a malfunction if a signal jump occurs in the measurement signal,
- transferring the load from the load-measuring pin to a safety pin when the load-measuring pin fails, wherein the safety pin is arranged between the cable thimble and the intermediate harness and penetrates a passage in the intermediate harness and a passage in the cable thimble, and at least one of the passage in the cable thimble and the passage in the intermediate harness surrounds the safety pin to form an annular gap prior to when the load-measuring pin fails.

18. The method as claimed in claim 17, wherein the step of detecting the malfunction includes detecting the malfunction when there is a negative signal jump in the measuring signal to a value which is less than a predefined lower limiting value, and when there is a positive signal jump in the measuring signal to a value which is more than an upper limiting value.

19. The method as claimed in claim 17, wherein the step of detecting the malfunction includes detecting the malfunction when the measurement signal exceeds a maximum limiting value which is stored in the evaluation device.

20. The method as claimed in claim 17, further comprising the step of performing at least one of switching off the winch drive and activating a brake of the cable drum when the malfunction is detected.

21. The method as claimed in claim 20, further comprising a step of restarting the switched off winch drive exclusively for winding the conveying cable onto the cable drum when a malfunction is detected in response to a negative signal jump while the conveying cable is being unwound from the cable drum.

22. The method as claimed in claim 20, further comprising a step of restarting the switched off winch drive exclusively for unwinding the conveying cable when a malfunction is detected in response to a positive signal jump while the conveying cable is being wound onto the cable drum.

23. The method as claimed in claim 17, further comprising the steps of:
- measuring a load on the winch drive,
- transmitting measurement signals acquired at the winch drive to a second evaluation device for evaluation of the measurement signals, and
- detecting a further malfunction if a signal jump occurs in the measurements signal.

24. The method as claimed in claim 23, wherein the step of detecting a further malfunction includes detecting the further malfunction when there is a negative signal jump of the load on the winch to a value which is less than a predefined winch drive lower limiting value and when there is a positive signal jump of the load on the winch to a value which is more than a predefined winch drive upper limiting value.

25. The method as claimed in claim 23, further comprising the step of performing at least one of switching off the winch drive and activating a brake of the cable drum when the malfunction is detected by at least one of the first evaluation device and the second evaluation device.

* * * * *